US010242248B2

(12) United States Patent
Bredno et al.

(10) Patent No.: US 10,242,248 B2
(45) Date of Patent: Mar. 26, 2019

(54) IMAGE ADAPTIVE PHYSIOLOGICALLY PLAUSIBLE COLOR SEPARATION

(71) Applicant: Ventana Medical Systems, Inc., Tucson, AZ (US)

(72) Inventors: Joerg Bredno, San Francisco, CA (US); Lou Dietz, Mountain View, CA (US); Jim F. Martin, Mountain View, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 184 days.

(21) Appl. No.: 14/892,505

(22) PCT Filed: May 28, 2014

(86) PCT No.: PCT/EP2014/061012
§ 371 (c)(1),
(2) Date: Nov. 19, 2015

(87) PCT Pub. No.: WO2014/195193
PCT Pub. Date: Dec. 11, 2014

(65) Prior Publication Data
US 2016/0098590 A1 Apr. 7, 2016

Related U.S. Application Data

(60) Provisional application No. 61/830,620, filed on Jun. 3, 2013.

(51) Int. Cl.
*G06K 9/00* (2006.01)
*G06K 9/46* (2006.01)
(Continued)

(52) U.S. Cl.
CPC ....... *G06K 9/00127* (2013.01); *G06K 9/4604* (2013.01); *G06T 7/0014* (2013.01);
(Continued)

(58) Field of Classification Search
None
See application file for complete search history.

(56) References Cited

U.S. PATENT DOCUMENTS 7,653,218 B1 * 1/2010 Malitz ................. G06K 9/0063
382/113
8,290,236 B2 10/2012 Lett et al.
(Continued)

FOREIGN PATENT DOCUMENTS

JP 2012-078176 A 4/2012
WO 2009006696 A1 1/2009

OTHER PUBLICATIONS

Gavrilovic, M., et al., "Blind Color Decomposition of Histological Images", IEEE Transactions on Medical Imaging, May 29, 2013, vol. 32, No. 6, pp. 983-994.
(Continued)

*Primary Examiner* — Randolph I Chu
(74) *Attorney, Agent, or Firm* — Ventana Medical Systems, Inc.

(57) ABSTRACT

The subject disclosure presents systems and methods for separating colors in an image by automatically and adaptively adjusting reference vectors based on information specific to the assay being imaged, resulting in an optimized unmixing process that provides stain information that is physically and physiologically plausible. The reference vectors are optimized iteratively, based on minimizing non-negative color contributions, background contributions, high-frequencies in color channels specific to background or unwanted fluorescence, signals from known immunohistochemical markers, and pairs of stains known to carry physiologically independent information. Adjustments to the reference vectors may be allowed within a range that is predetermined based on measuring colors from multiple input images.

19 Claims, 8 Drawing Sheets

(51) Int. Cl.
  *G06T 7/00*    (2017.01)
  *G06T 7/11*    (2017.01)

(52) U.S. Cl.
  CPC ...... *G06T 7/11* (2017.01); *G06T 2207/10024* (2013.01); *G06T 2207/10064* (2013.01); *G06T 2207/30024* (2013.01)

(56) References Cited

U.S. PATENT DOCUMENTS

| | | |
|---|---|---|
| 2008/0212866 A1 | 9/2008 | Lett et al. |
| 2012/0082364 A1 | 4/2012 | Tani |

OTHER PUBLICATIONS

Ruifrok, A.C. and Johnston, D.A., "Quantification of Histochemical Staining by Color Deconvolution", Analytical and Quantitative Cytology and Histology, Aug. 2001, vol. 23, No. 4, pp. 291-299.

Macenko, M., et al., "A Method for Normalizing Histology Slides for Quantiative Analysis", Biomedical Imaging: From Nano to Marco, Jun. 28, 2009, pp. 1107-1110.

Berger, C., et al., "Color Deconvolution and Support Vector Machines", Computational Forensics, Aug. 13, 2009, pp. 174-180.

Woolfe, F., et al., "Autoflurescence Removal by Non-negative Matrix Factorization," IEEE Transactions Image Process, 2011, vol. 20, No. 4, pp. 1085-1093.

Van Benthem, M., et al., "Fast Algorithm for the Solution of Large-scale Non-negativity-contrained Least Squares problems," Journal of Chemometrics, 2004, vol. 18, No. 10, pp. 441-450.

Montcuquet, A., "Nonnegative matrix factorization: A Blind Spectra Separation Method for in vivo Flurescent Optical Imaging," Journal Biomedical Optics, 2010, vol. 15, No. 5, pp. 056009.

\* cited by examiner

IMAGE ADAPTIVE PHYSIOLOGICALLY PLAUSIBLE COLOR SEPARATION

BACKGROUND OF THE SUBJECT DISCLOSURE

Field of the Subject Disclosure

The present subject disclosure relates to imaging for medical diagnosis. More particularly, the present subject disclosure relates to identifying physiologically plausible stain vectors within an assay.

Background of the Subject Disclosure

In the analysis of biological specimens such as tissue sections, blood, cell cultures and the like, biological specimens are stained with one or more fluorophores or chromogens, and subsequently scanned or photographed for analysis. Observing the signals generated from the scan enables a variety of processes, including diagnosis of disease, assessment of response to treatment, and development of new drugs to fight disease. An assay includes biological specimens such as tissue sections from human subjects that are treated with a stain containing a fluorophore or chromogen conjugated to an antibody which binds to protein, protein fragments, or other targets in the specimen. Upon scanning the assay, multiple channels of image data including color channels are derived, with each observed channel comprising a mixture of multiple signals.

Generally, color separation (or spectral unmixing) is used to determine a concentration of specific stains within an observed channel or channels of an assay. This may also be known as color de-convolution. Each pixel of a scanned image is represented by a vector of image values, or a color vector, and each stain corresponds to a reference vector, also known as a reference spectrum. The local concentration of the stain is represented by a scaling factor of a reference vector. Therefore, the color vector for a pixel that contains multiple co-located stains with different concentrations is a linear combination of the reference spectra of all the present stains. Typically, fluorescence imaging color channels directly provide the image vector and reference spectra. In brightfield (transmission) imaging, light intensities emitted by the stained tissue are transformed into an optical density space, with mixing of different stains being represented by a linear weighted combination of the contributing reference spectra.

The unmixing process extracts stain-specific channels to determine local concentrations of individual stains using reference spectra that are well-known for standard types of tissue and stain combinations. However, the reference spectra for pure stains tend to vary with tissue type, controlled and uncontrolled process parameters during staining, and with age. For instance, there are always variations within a tissue type based on age of the tissue, age of the stain, how the tissue was stored, dehydrated, fixed, embedded, cut, etc. These variations can influence how a stain will appear, and can result in unwanted artifacts in the results of an unmixing process. Existing methods cannot handle such errors without human guidance, and no reliable reference spectra are available for such variations. Therefore, incorrect separation and physiologically or physically implausible results continue to occur. Moreover, with respect to bright field images containing 3 color channels, any co-location of greater than 3 stains cannot be unmixed, or no unambiguous mathematical solution exists.

SUMMARY OF THE SUBJECT DISCLOSURE

The subject disclosure presents systems and methods for separating colors in an image by automatically and adaptively adjusting reference vectors based on information specific to the assay being imaged, resulting in an optimized unmixing process that provides stain information that is physically and physiologically plausible. The reference vectors are optimized iteratively, a non-constrained color deconvolution or unmixing is applied, and the resulting color channels are correlated with a plurality of rules that are applied based on information about the assay. The plurality of rules comprise, for instance, minimizing negative color contributions, background contributions, high-frequencies in color channels specific to background or unwanted fluorescence, signals from known immunohistochemical markers, and pairs of stains known to carry physiologically independent information. The correlation may be used to determine an overall quality of the result. If the quality is unacceptable, the reference vectors may be adjusted, and the color channels iteratively unmixed with the adjusted reference vectors, until all rules are satisfied and a result with acceptable quality is obtained. Adjustments to the reference vectors may be allowed within a range that is predetermined based on measuring stain reference vectors from multiple input images.

In additional embodiments, optimized reference vectors may be determined not only for the particular image, but also for specified regions within the particular image, including individual pixels. The reference spectra adjustments and corresponding quality metric based on the rules may vary spatially throughout the image. Further, an intensity of a stain may be determined from an image or a region of an image, and reference vectors may be correspondingly adjusted prior to unmixing. In addition, a brightfield image comprising three channels but having more than 3 stains may be unmixed using the assay information. The optical density space comprising three or more colors in the image may be partitioned into pre-defined colocation systems. The assay information includes details about the assay at hand, the biomedical structures stained with the assay, types and numbers of stains and counterstains and linear mixtures thereof, as well as additional metadata such as an age of the assay, tissue type and age, etc.

DETAILED DESCRIPTION OF THE SUBJECT DISCLOSURE

Figure 1:
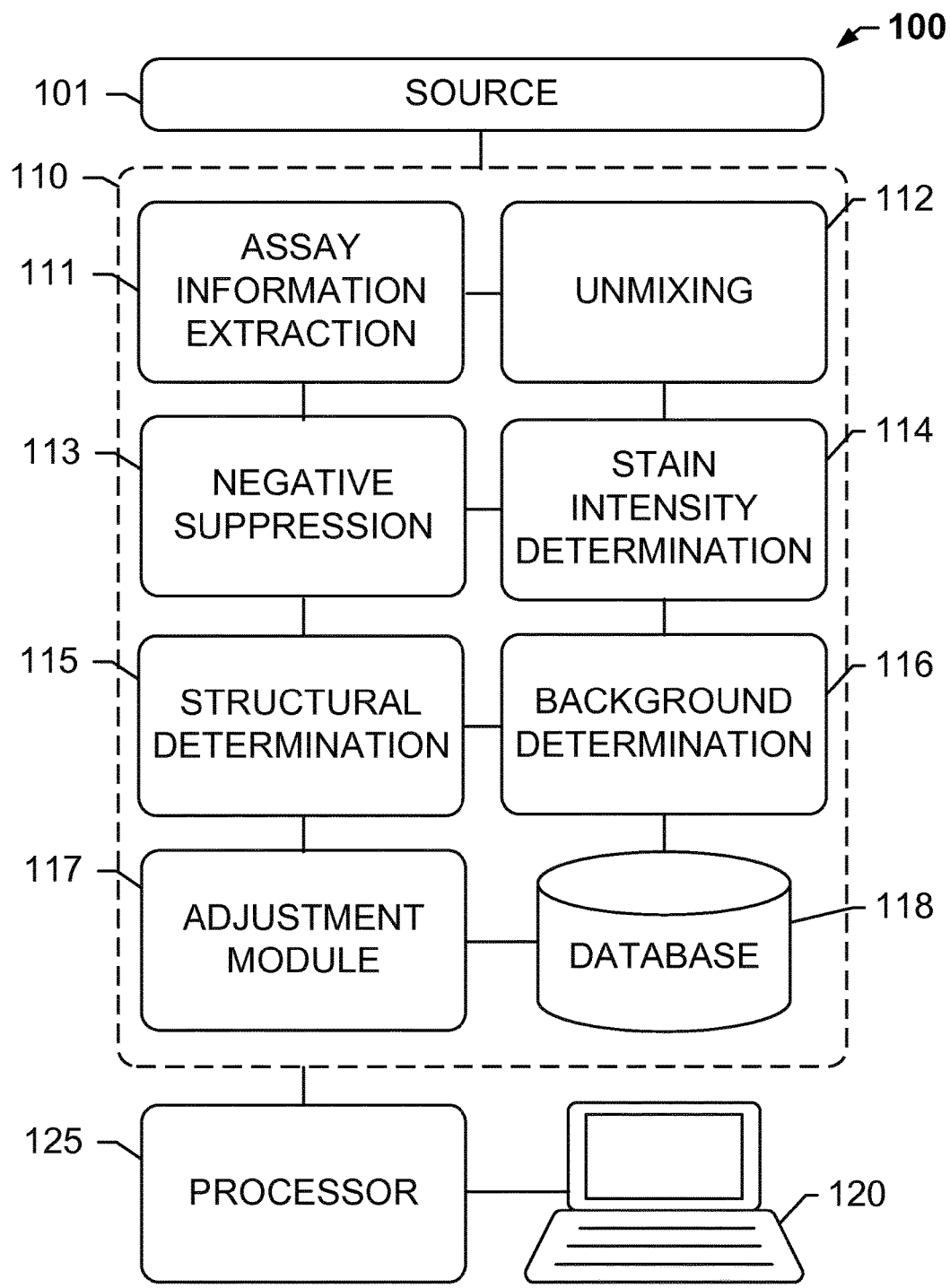
FIG. 1 shows a system for optimizing reference vectors, according to an exemplary embodiment of the present subject disclosure.

The disclosed systems and methods process images to separate or "unmix" component signals of the image using iteratively optimized reference vectors. Image data from an assay is correlated with expected or ideal results specific to the characteristics of the assay to determine a quality metric. In the case of low quality images or poor correlations against ideal results, one or more reference vectors are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended/not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

Within the following description, any references to spectral unmixing, color deconvolution, and color separation are synonymous and are related to the process of obtaining the local concentration or amount of stains in an image from image data that contains a mixture of these stains. This mixture is most often assumed to be linear, and linear unmixing methods are utilized. However, non-linear methods may also be applied to perform the unmixing.

For bright field imaging, the assay results in an absorption and attenuation of light that is transmitted from a light source through the stained specimen. An exemplary method for unmixing this image data utilizes the optical density space, where reference colors and image data are transformed into light attenuation signals, for instance using the Lambert-Beer law. Analysis of the image data and the mixture model (i.e. the mathematical description of the image data and the effect of stains) as used herein is not necessarily limited to known methods, and may include additional models of light scattering within the tissue sample, including modeling of possible diffraction, and other methods for determining how light detected by a detector, for example a CCD or CMOS sensor in a bright field microscope in a fluorescence microscope, or a whole-slide scanner, correlates to the amount of light absorbed in or emitted by an assay.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for optimizing reference vectors, according to an exemplary embodiment of the present subject disclosure. System 100 comprises a source 101 for generating assay information. For instance, source 101 may be a spectral camera, a CCD, or a CMOS sensor in a scanner, a bright field microscope, a fluorescence microscope or a whole-slide scanner that is used for imaging an assay comprising a sample of a material such as a biological specimen stained with one or more fluorescent or chromogenic stains and markers. Source 101 is in communication with a memory 110, which includes a plurality of processing modules or logical instructions that are executed by processor 125 coupled to computer 120. For instance, a sample, such as a biological specimen, may be mounted on a slide or other substrate or device for purposes of imaging by source 101, with analysis of images of the sample being performed by processor 125 executing one or more of the plurality of modules stored on memory 110 in accordance with the present disclosure. The analysis may be for purposes of identification and study of the sample. For instance, a biological or pathological system may analyze the sample for its anatomical structure and the presence and organization of cells, proteins, protein fragments or other markers indicative of cancer or other disease, or for other purposes, for example genomic DNA detection, messenger RNA detection, protein detection, detection of viruses, detection of genes, or other.

The sample may be stained by means of application of a stain containing one or more different markers, fluorophores, or chromogenic stains. Fuorophores may comprise one or more nano-crystalline semiconductor fluorophores (i.e., quantum dots), each producing a peak luminescent response in a different range of wavelengths. Quantum dots are well known, and may be commercially available from Invitrogen Corp., Evident Technologies, and others. One or more of the fluorophores applied to the sample may be organic fluorophores 14 (e.g., DAPI, Texas Red), which are well known in the art, and are described in at least commonly-owned and assigned U.S. Pat. No. 8,290,236, the contents of which are incorporated by reference herein in their entirety. Chromogenic stains may comprise Hematoxylin, Eosin, Fast Red, or 3,3'-Diaminobenzidine (DAB). Thus, system 100 can be used with a sample that is stained with just quantum dots, with quantum dots in combination with conventional organic fluorophores, just conventional organic fluorophores, chromogenic stains, or any other combination or stains and markers. Moreover, a typical sample is processed in an automated staining/assay platform that applies a stain to the sample. There are a variety of commercial products on the market suitable for use as the staining/assay platform, one example being the Discovery™ product of the assignee Ventana Medical Systems, Inc. For example, in a fluorescence imaging process, after preliminary tissue processing and staining, the sample is supplied to a camera system including a spectrum source, for example, a light source for illuminating the sample at wavelengths intended to produce a luminescent response from the fluorophores applied to the specimen. In the case of quantum dots, the light source may be a broad spectrum light source. Alternatively, the light source may comprise a narrow band light source such as a laser. The camera platform may also include a bright field microscope, one example being the VENTANA iScan HT product of the assignee Ventana Medical Systems, Inc., or any microscope having one or more objective lenses and a digital imager, as well as a set of spectral filters. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

The information acquired from the assay via source 101, including color channels, intensities, and any additional metadata, may be supplied to computer-readable medium 110, via a cable connection between the microscope 101 and computer 120, via a computer network, or using any other medium that is commonly used to transfer digital information between computers. The assay information may also be supplied over the network to a network server or database for storage and later retrieval by computer 120. Besides processor 125 and memory 110, computer 120 also includes user input and output devices such as a keyboard, mouse, stylus, and a display/touchscreen. As will be explained in the following discussion, processor 125 executes logical instructions stored on memory 110, performing analysis of the assay information, executing one or more unmixing operations, detecting structures in the image, quantitative analysis, and display of quantitative/graphical results to a user operating computer 120.

For instance, as described above, an assay is scanned at source 101 to generate image data comprising a mixture of several color channels. For instance, the image data may comprise emission spectra, absorption spectra, fluorescence, or any other signals comprised by the assay. The image data may further comprise standard red, green, and blue color channels. In the event that the source 101 is a bright field microscope detecting white light transmitted through the assay, the image data may comprise a plurality of channels with different wave length ranges or also comprise standard red, green, and blue channels. Any number of separate color channels may be included. In the case source 101 is a fluorescence microscope, the image data may include quantum dot (Q-dot) channels, as well as a channels for stains and counterstains. The imaged channels and their wavelength ranges can be chosen for general use or adjusted to an assay and tissue type at hand. For instance, unmixing is possible for specialized microscopes, e.g. microscopes with various filters, excitation light wavelengths, bright field light source wavelengths etc., as well as for standard imaging settings, e.g. red-green-blue cameras and white light sources. The image data, along with additional assay information, is extracted and parsed by an assay information extraction module 111. Additional assay information may comprise a stain identification, process parameters of staining (for example incubation times and concentrations of reagents), a tissue type, and other physical or physiological information. The additional assay information may be stored in a metadata of one or more data packets received by information extraction module 111 and provided for example by a user, a laboratory information system connected to system 100, or read from a barcode affixed to a slide that carried the biological specimen. Other methods of providing assay information into system 100 will become apparent to those having ordinary skill in the art in light of this disclosure.

An unmixing module 112 may be invoked to unmix the image data, selected portions of the image data, or mixtures (for example, linear mixtures or substantially linear mixtures) of signals isolated to a specific region of the image data to obtain a stain-specific vector. For the purposes of this disclosure, unmixing is synonymous with spectral unmixing, color deconvolution, and color separation. However, any other known or future method for separating a mixture may be used. In an exemplary embodiment, a linear least-squares method is used. For instance, unmixing module 112 may utilize known reference spectra, based on the assay information, to unmix a mixture of signals in a particular pixel to obtain component signals or vectors corresponding to the stains or structures in that pixel. Unmixing module 112 may retrieve one or more known reference vectors from a reference spectra database on memory 110, such as database 118. For example, a linear spectral unmixing process may obtain a linear combination of vectors corresponding to one or more stains co-located on a single pixel, with each vector being weighted by its intensity or concentration. The reference vectors for each marker that are used to unmix the combination are iteratively optimized by the assay-dependent correlation and analysis described herein.

A negative suppression module 113 is used to identify any negative vectors resulting from the unmixing process. The presence of a negative value indicates that a pixel may contain a mixture with at least one stain having a negative concentration, which is physically implausible. Negative suppression module 113 uses the presence of the negative value to infer that the unmixing result is of a lower quality due to one or more incorrect reference vectors. Although prior methods have used non-negative constraints during the unmixing process that forces all results to be mathematically positive, these methods largely ignore the fact that a negative value was returned. Instead, negative suppression module 113 recognizes an error, and may adjust a quality metric to indicate such anatomical or physical implausibility. This triggers an automatic adjustment or optimization of reference vectors to unmix the image data again. The unmixing may be triggered from the recognition of a negative value, or the unmixing may be delayed until the other modules are processed to determine the quality metric.

A stain intensity determination module 114 performs logical operations that determine an intensity of a stain from the image data, for example the whole image, a region in the image, or individual pixels in the image, and appropriately select or adjust reference vectors prior to unmixing the image data. The stain intensity determination may be executed simply from the color vectors comprised by the image data, without needing any specific assay information. For instance, signals from a bright field microscope may be processed to compare a source light intensity with a detected light intensity having passed through the tissue to indicate an intensity of one or more stains on the assay, a region, or an individual pixel in the image, prior to any separation of colors and stains. A fluorescent image may be processed to determine a total intensity or overall brightness emitted from a piece of tissue, enabling a determination of an average stain intensity without requiring separation of stains, colors, hues, and other contributions. In either case, given an average or overall intensity of staining for the image or pixel, a predefined set of reference vectors associated with the stain intensity may be used to unmix the image data. For instance, different sets of initial reference vectors may be predefined for very light, light, moderate, strong, and very strong stain intensities. Stain intensity determination module 114 categorizes the measured intensity into one of these categories, and selects the appropriate set of initial reference vectors or spectra.

Structural determination module 115 identified structures within the image data, and correlates these structures with known combinations of structures and/or stains to identify and eliminate known or obvious implausibilities. For instance, it may be known that two specific quantum dots are unable to coexist in a certain sample material. The inconsistent, unrealistic or impossible signal or signals may be recognized by structural determination module 115, and accounted for by minimizing or eliminating the offending signal. The known inconsistent, unrealistic or impossible signal or signals may be retrieved from database 118, or any other data store in communication with the system, or a skilled operator of the system, such as a pathologist or knowledgeable technician. Structures may be determined by parsing the image data or unmixed results to recognize structures of a specific size, shape, or color. For instance, small round cells stained with a brown dye may be recognized, and their component vectors compared with an ideal result to determine whether or not their presence and/or structure is plausible. Further, an amount of residual stain may be identified and eliminated. For instance, any brown stain that does not correspond to a small round shape may be identified as noise, or just unwanted signals. In addition, structural determination module 115 minimizes or eliminates high frequency contributions caused by undesired elements, such as fluorescence or chromogenic signals from unexpected small structures, strong edges, glass and other parts of the assay, embedding materials, or background materials.

Background determination module 116 may recognize one or more background signals within the mixture of signals based on a spectral signature associated with a background signal or a location of a pixel comprised by a mixture of signals that includes at least one of the background signals. A background signal may be recognized by its unique signature (for example associated with the glass of the slide, the glue for the coverslip, autofluorescence of the tissue) and ubiquitous dispersion through the image. Certain regions of the image may be determined to contain predominantly, or only, a signal, such as autofluorescence, etc. Upon determining a component signal having a signature associated with background, for example a broadband signature, the component signal may be compared with known background signatures specific to the sample material being analyzed. For example, a system such as for image analysis of anatomical or clinical pathology may compare a scanned slide of a tissue sample with an image of a calibration slide containing similar tissue samples having known background signatures, to identify the background signals in the scanned image. Database 118 may include the known signature. The known background signature may be compared with regions of the image to recognize predominantly broadband signals within said regions. For a signal that arises from the background, glass, and/or global structures (i.e., structures that are present throughout the image), the existence of small structures or high-frequency image content (for example fine texture) in the unmixed image is indicative of an incorrect reference vector for this signal. The existence and strength of such small structures is a negative contribution to a quality metric. Consequently, unwanted signals are removed from the unmixing result by detecting the signals with the correct reference vector, and identifying incorrect reference vectors based on shadows from structures (e.g., cells in the tissue) that are not background. This indicates that the reference vector for such a background signal needs adjustment.

Figure 2:
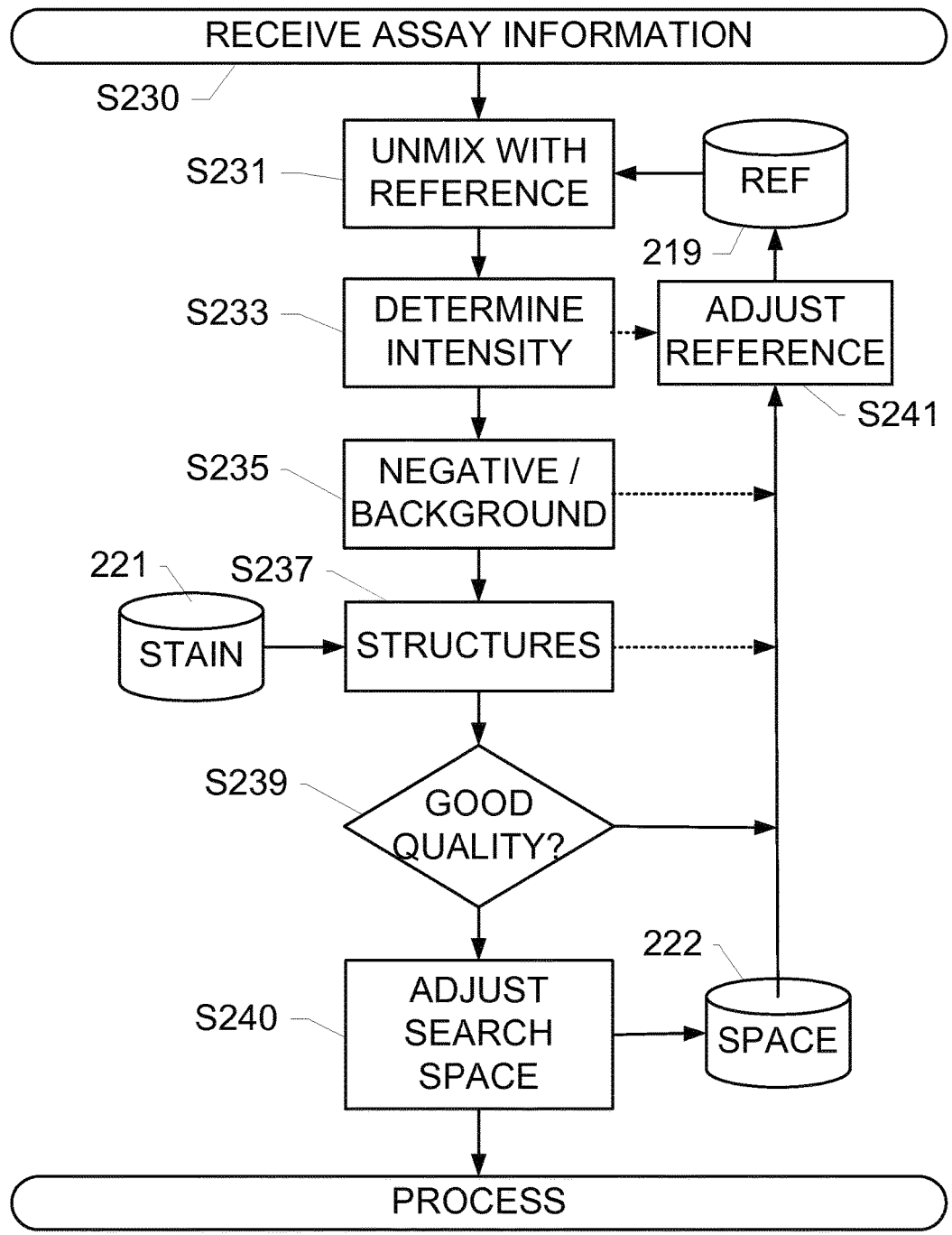
FIG. 2 shows a method for optimizing reference vectors, according to an exemplary embodiment of the present subject disclosure.

Adjustment module 117 iteratively adjusts the input or initial reference vectors in database 118 based on the results from each module 111-116. Further, the results of each module can be combined to generate a quality metric. For instance, structural determination module may indicate an implausible combination of structures, resulting in a negative indication of quality, or a lower quality metric. Alternatively or in addition, after the unmixing process executed by processor 125, a mutual correlation of the unmixed stain-specific images may result in a lower quality metric. Any conflicts between modules, such as an unmixing process that provides results that are individually plausible in each stain-specific channel, but where results conflict between different stain-specific channels, similarly indicate a low quality result. For example, it might be known that two stains are mutually exclusive for a tissue type at hand, such that high concentrations for these stains in the same location are not plausible. The resulting quality metric may trigger an adjustment of the initial reference vectors within their search space or allowed range, and a repeated unmixing process. The unmixed result may again be assessed by each module, with the results being used to generate a new quality metric. The quality metric may be compared with a known quality metric for an ideal assay, and upon determining that the quality metric is sufficiently close to the ideal assay, the adjustment module 117 may stop adjusting reference vectors, and indicate that the unmixed signals are close to ideal. A variety of optimization strategies, for example a simplex downhill optimization strategy (i.e. a strategy that maximizes the quality metric by automatically adjusting reference vectors and iteratively checking the resulting quality metric) can be employed to adjust the reference vectors in a way that increases the quality metrics. Database 118 may be updated with the new optimized reference vector in a field associated with the particular assay information. Further, this sequence of operations may be iteratively executed by a method, as shown in FIG. 2.

Further, the quality determination may be specific to a user query. For instance, a user input may isolate the unmixing or structural determination process to searching for cells in a particular color channel, or a query may be submitted requesting a quality of a specific structure. The structural determination and unmixing modules may process the image data subject to the requirements of the query, and adjustment module 117 generates an appropriate quality metric. The reference vectors may be adjusted within a search space for each reference vector that defines how much and in which direction the reference vector can be changed. The search space may be predefined and fixed. Training data with known reference vectors from different images may be collected and analyzed to provide an initial or default reference vector, along with a range of allowed changes of the reference vector to define the search space. In some exemplary embodiments, a principal-component-analysis (i.e. an analysis that identifies a mean of the training data as initial value for the reference vectors and directions, such as eigenvectors, and distances such as eigenvalues in which these can be modified during the optimization) may be used to determine a valid search space from training examples.

Further, other refinement operations such as adjusting a minimum or a maximum of stain concentrations in the unmixed image data may be applied to highlight a specific range and eliminate signals outside the range. An image resulting from the unmixed set of signals may be adjusted for contrast to see a more dynamic range. For instance, data obtained after spectral unmixing may be of insufficient resolution in terms of its dynamic range, and therefore a brightness or contrast adjustment (which artificially increases the dynamic range of the image content for the unmixed channels) may make it visually easier to perceive how strong the unmixed channels are at different pixels in the image. Such adjustments enable studying an output from an unmixed channel and improve image understanding. Other imaging operations may be performed, with any resultant image, as well as interfaces for executing and manipulating the modules stored in memory 110, being depicted on a display of computer 120.

As described above, the modules include logic that is executed by processor 125. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 110, which in an exemplary embodiment may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

FIG. 2 shows a method for optimizing reference vectors, according to an exemplary embodiment of the present subject disclosure. The method of FIG. 2 may be performed by a computer executing modules similar to those depicted in FIG. 1. The method begins with an image of a sample received from a source such as such as source 101 associated with or including a scanner or spectral camera (S230), or any source that can capture image content at a range of frequencies. The sample may be stained by means of application of a stain containing one or more different fluorophores or chromogenic stains, illuminated by, for example, a light source, and an image captured by a camera, as described above. The image is supplied to a computer that executes logical instructions stored on a memory for performing the operations described in the exemplary method.

The assay information comprises image data as well as additional assay information. The image data comprises multiple color channels detected by a source as detailed above in a plurality of channels with different wave length ranges. The image data, along with additional assay information, is extracted and provided to an unmixing module to be unmixed (S231) to obtain component signals or stain-specific vectors comprised by the image data. The unmixing utilizes known reference spectra/vectors, retrieved from reference database 219, based on the assay information. In other embodiments, the reference vectors may be iteratively optimized prior to unmixing. For example, an intensity determination (S233) may be invoked for the overall image, for regions in the image, or individual pixels to determine optimal reference spectra prior to unmixing. The stain intensity determination (S233) may be executed simply from the color vectors comprised by the image data, without needing any specific assay information. Given the stain intensity from S233 for the image, a region in the image, or pixel, a predefined or adjusted set of reference vectors associated with the stain intensity may be selected (S241) for unmixing the image data. The result of intensity determination (S233) may be used to determine (for example, by shifting the reference vectors to correspond more closely to actual intensity values) new reference spectra (S241), or the method may proceed to a negative suppression and background determination (S235). Any negative vectors resulting from the unmixing process are identified, and a determination is made that the unmixing result is of a lower quality due to an incorrect reference vector.

Again, the method may proceed to automatically adjusting a quality metric to indicate such anatomical or physical implausibility, selecting an adjusted or optimized reference vector (S241) to unmix the mixture again, or the method may proceed to the determination of physiologically plausible structures (S237). This step identifies structures within the image data, for instance by parsing the image data or unmixed results to recognize structures of a specific size, shape, or color. Structures of interest may be input into the system by a user, or extracted from assay information. These structures may be correlated with known combinations of structures and stains stored in stain database 221 to identify and eliminate known or obvious implausibilities. For instance, it may be known that two specific markers are unable to coexist in a certain sample material or can only appear in structures of known shape and size. Such "impossibilities" may be recognized and accounted for by minimizing or eliminating the inconsistent or unrealistic signal. For instance, an RGB bright field image provides a red, green, and blue intensity for an assay stained with a blue dye, a brown dye, and a red dye. Upon unmixing the channels for each dye or stain, a presence of a structure can be determined by correlating the unmixed result with information known about the assay. Based on the knowledge, for example, that small round cells are stained with the brown dye, larger cells with no specific shape, such as macrophages, are stained with the red dye, and the background and all cell nuclei are stained blue, any signals indicating a small round structure that is colored red is a physiological implausibility. Similarly, any large brown region is implausible, since it does not correlate with what is known about the specific stain/structure combination identified in the assay information.

Consequently, a quality of the image is compromised, thereby either triggering an adjustment to a reference vector used to unmix the image (S241), or influence a quality metric (S239) in addition to all the results of the correlation steps. The quality metric may additional compare a quality of the unmixing result with a known or ideal result given the assay type, and a determination is made whether to adjust reference vectors (S241) and repeat the process, or to end the cycle if the quality is acceptable. An acceptable quality may be determined based on a predefined threshold. Upon determining that the quality of the result is good, or that the resulting vectors are physiologically plausible, a search space for the vector may be adjusted (S240) to include the acceptable quality metric, and stored in a space database 222 associated with the reference vector database 219. If the quality metric is unacceptable or below a threshold, the reference vectors may be adjusted (S241) within a search space for each reference vector that defines how much and in which direction the reference vector can be changed.

These steps may be iteratively performed with the initial reference vectors in database 219 being adjusted and the image data unmixed (S231) and new quality metrics generated until a determination that the quality metric is sufficiently close to the ideal assay, or that no further improvement is possible. Upon determining an optimal quality, the method may adjust the search space (S240) for the vector to include or highlight the current configuration, based on the assay information. The search space may dynamically expand or contract with each application to image data, enabling continuous training of the system.

Figure 3A:
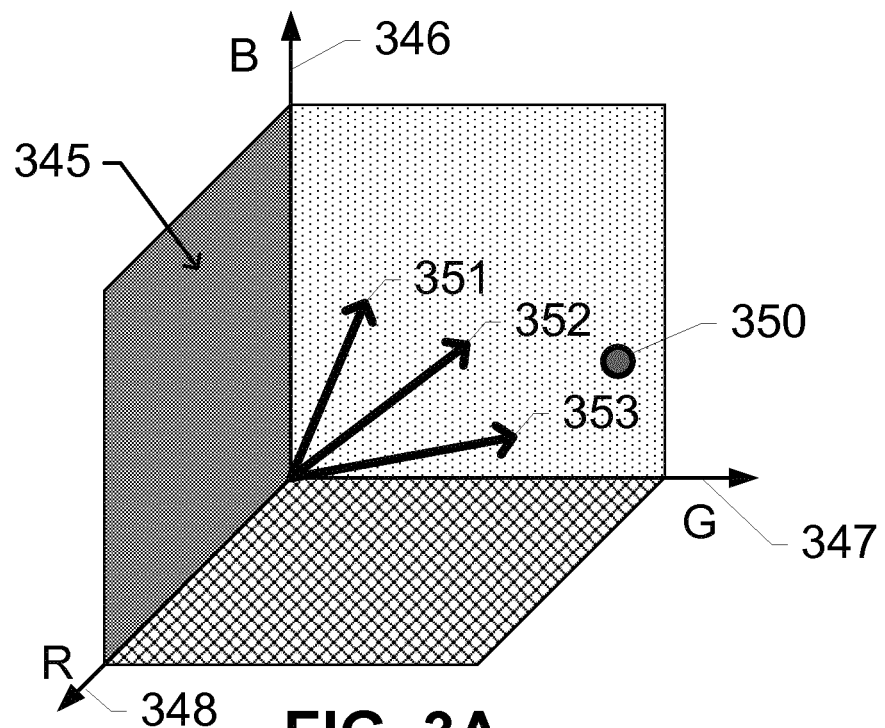
FIGS. 3A and 3B show adjustment of reference vectors in an optical density space, according to an exemplary embodiment of the present subject disclosure.
Figure 3B:
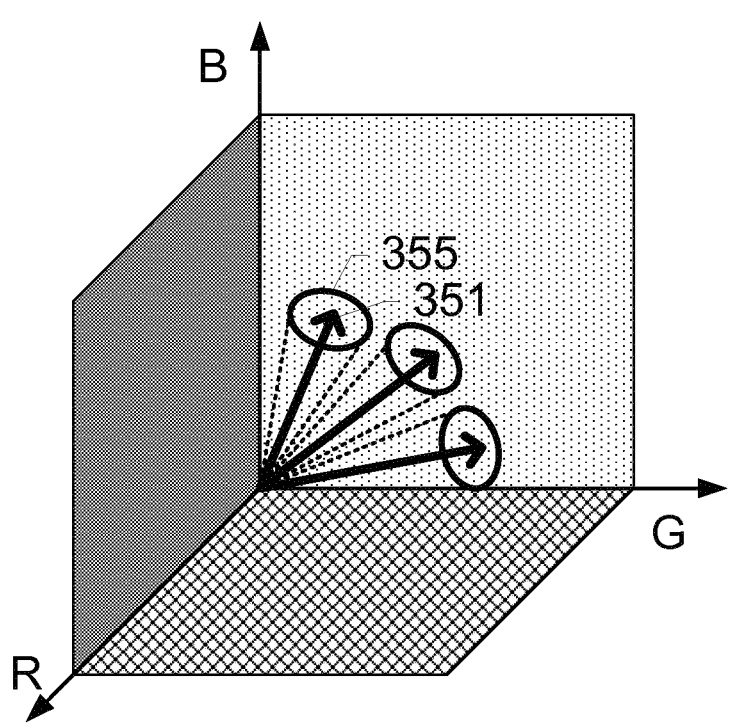

FIGS. 3A and 3B show adjustment of reference vectors in an optical density space, according to an exemplary embodiment of the present subject disclosure. The optical density space is used when applying the present subject disclosure to bright field images. Optical density is the property of a stain or color that corresponds to an amount of light absorbed in transmission imaging. For fluorescence images, this space is referred to as reference vector space and reflects the emission of a fluorophore or quantum dot in the different wavelength ranges acquired by a scanner. As described herein, each reference vector may be adjusted or optimized within a predefined search space based on assay information. The optical density space depicted in FIG. 3 comprises three colors for ease of visualization. For the purposes of this disclosure, an image may comprise any number of colors, with its corresponding optical density space being partitioned into pre-defined colocation systems, as shown in the present embodiment.

FIG. 3A shows a value of a pixel 350 in an optical density space 345, alongside its corresponding reference vectors 351, 352, and 353, that may be linearly mixed to obtain the pixel value. In the presented example, optical density space 345 comprises three axes based on the three colors of the image, i.e. blue 346, green 347, and red 348. Pixel 350 is unmixed into its component vectors 351, 352, and 353. For instance, the component vectors of the pixel indicate a blue vector 351, a red vector 352, and a brown vector 353, each vector having a different direction and intensity that enables a mixture of the three vectors to arrive at the pixel 350.

FIG. 3B shows how each component reference vector is adjustable within its search space 355. The search space 355 may be predefined to encompass a plurality of known anatomical, chemical, and biological assumptions and variations. The search space 355 may be a predefined range of allowed changes of the reference vector 351, with the range being based on training data as described herein. In one exemplary embodiment, a ten-percent variation may be permitted for each reference vector, and the reference vectors iteratively adjusted within such a ten-percent variation until a satisfactory result is achieved. In additional embodiments, several training assays having pure and isolated stains may be unmixed and variations in the results being used to estimate average reference spectra along with an average variation to determine a search space 355.

As described herein, the optical density spaces depicted in these embodiments are shown with three-color images, but the principles described herein may be applied to multi-dimensional and multi-channel images from bright field and fluorescence imagers. For simpler images comprising three color channels, for instance an RGB image scanned by a bright field microscope, any single stain or co-location up to three stains can be unmixed with known methods. The embodiments described herein provide means for unmixing any type of image, including an RGB image, stained with a number of stains that is greater than a number of dimensions or colors in the image data. Assay-specific information and rules may be applied to partition any optical density space or reference vector space into pre-defined co-location systems. These systems are defined based on the assay at hand, the biomedical structures stained with the assay, and the co-existence of these structures in a region as small as an image pixel. Based on prior knowledge of what stains, structures, and markers are comprised by the assay, and a hierarchy of known possible co-locations, the reference vector space (for instance, an optical density space) can be partitioned to determine physiologically plausible co-locations. Such a graphical representation may be used to optimize reference vectors for unmixing the image or pixel. For instance, a particular region may be dedicated solely to one compartment or region of the optical density space, and therefore an un-mixing of the region would likely result in a pure stain vector. In another example, a counter stain hematoxylin or DAPI may be used to stain every cell nucleus blue, and may only co-locate with specific stains or markers, resulting in an unmixing process using the appropriate reference vectors. Other areas of the optical density space comprising additional stains may similarly be assessed and compared with known co-locations prior to unmixing, resulting in a more efficient and accurate unmixing process by excluding all unlikely co-locations.

FIGS. 4A-4D show optical density spaces partitioned into segments of co-located stains, according to an exemplary embodiment of the present subject disclosure. The 3-dimensional optical density space 445 depicted in FIG. 4A comprises two stain-specific vectors 451 and 453 that produce a pixel value 450 when mixed. In this optical density space, any possible mixture of the same two stains would necessarily fall within the circle segment spanned by the two stain reference vectors. Further, any possible mixture of three or more stains would falls into a pyramidal or conical region spanned by the three or more reference vectors. Regardless of how much of each stain is used, any combination of these specific stains will always fall into a limited region of the optical density or reference vector space. This principle may be used to predict or determine locations of any possible values of the combinations of vectors. For instance, adding another stain to a system of two stains may result in a pyramidal or conical region, and a logical determination that all possible variations of the three stains would fall within the pyramid or cone. Similarly, adding a fourth stain would result in a pyramid with a quadrilateral base, with the pyramid necessarily comprising all possible combinations of the four stains.

Figure 4A:
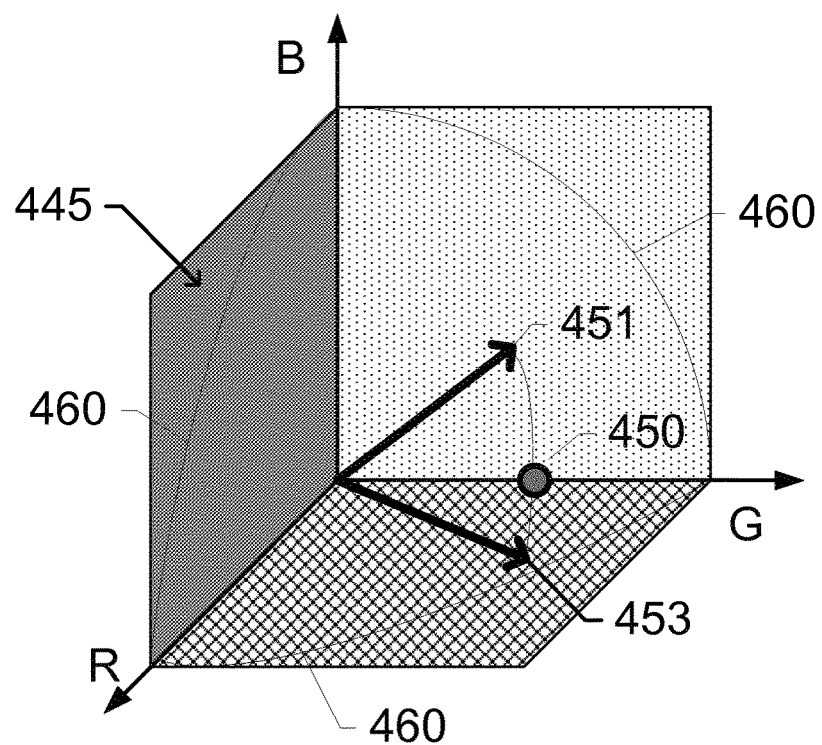
FIGS. 4A-4D show optical density spaces partitioned into sections for co-located stains, according to an exemplary embodiment of the present subject disclosure.
Figure 4B:
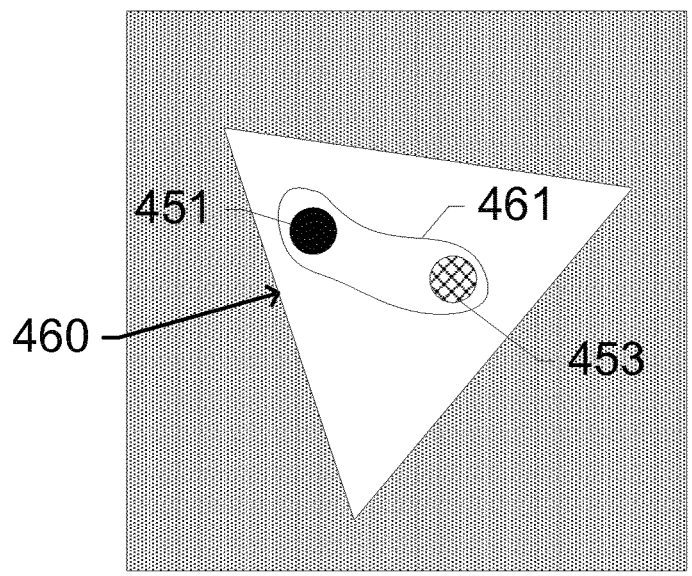
Figure 4C:
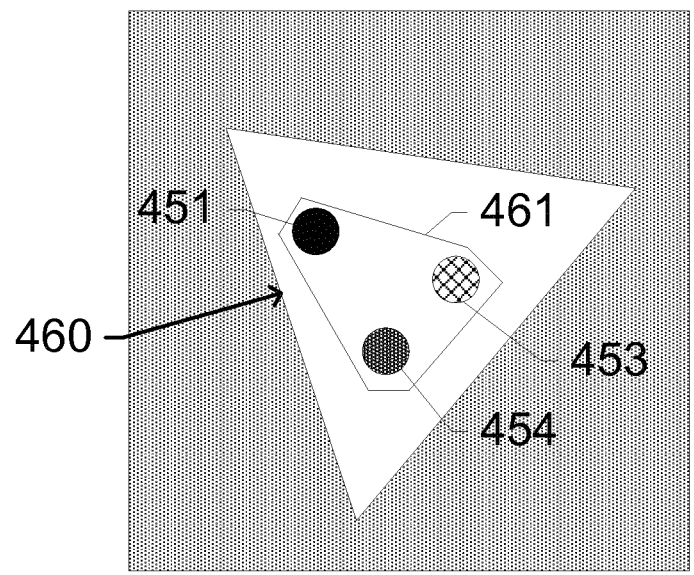
Figure 4D:
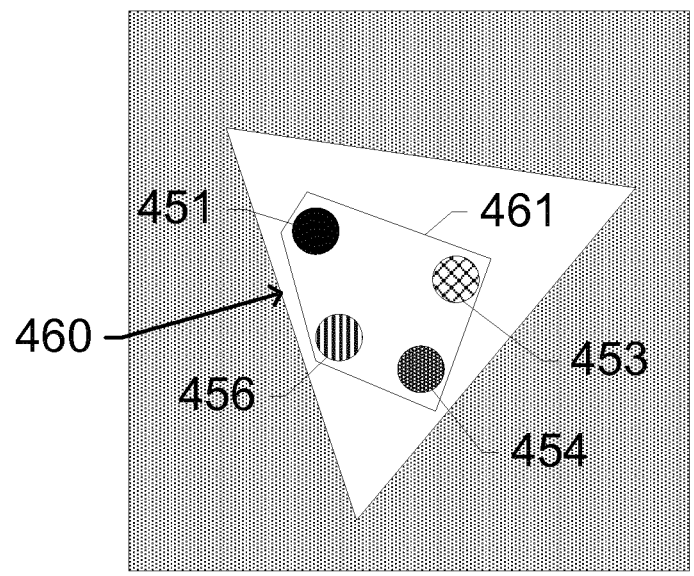

Moreover, the optical density space can be flattened into a 2-dimensional representation 460, as shown in FIG. 4B. In this planar representation, all possible mixtures of the two stains 451 and 453 fall within a region 461 connecting the stains. FIGS. 4C and 4D respectively show regions 461 encompassing any possible combination or co-location of three stains 451, 453, and 454, and four stains 451, 453, 454, and 456 contained in a single image signal or pixel. Although this exemplary embodiment is described for three color channels sourced from an RGB camera, the principles described herein are applicable to any type of image data, such as multi-spectral images, florescent image data, etc., in any combination that may be unable to be visually depicted, but may be processed by a computer as described herein.

The application preferences used to compartmentalize sections of an optical density space are based on known possible or physiologically plausible co-locations for specific assays. These known co-locations include general biological knowledge as well as specific knowledge of what biomarkers are being targeted for the assay at hand, and may be ordered by priority, or a hierarchy of importance or likelihood. For instance, a hematoxylin counterstain stains all cell nuclei in a sample, and typically appears on its own, without co-locating with other signals. Another marker, Ki67, only stains nuclei of cancer cells that proliferate. Ki67 necessarily appears alongside hematoxylin, so any appearance of a Ki67 marker that is independent would be considered physiologically implausible, and therefore ignored or suppressed. By iteratively comparing the optical density space with such a list of biomarkers that are being targeted for the assay at hand and the reference vectors of the stains associated with these biomarkers, the image data may be unmixed using only specific vectors that result in physiologically plausible vectors.

TABLE 1

| # | Mixing system | Description |
|---|---|---|
| 1 | Counterstain only | The counterstain (mostly Hematoxylin) stains the cell nucleus of every cell in the tissue. It can appear on its own without co-location (and does so frequently) |
| 2 | Counterstain + Ki67/Stain 1 | Ki67 is a marker for nuclei of tumor cells that proliferate. The marker is stained with Stain 1, and it can only appear together with the counterstain, which marks all cell nuclei. |
| 3 | CD20/Stain 2 only | CD20 marks the cell membrane of B-cells. Stain 2 can appear with no co-location in the membrane of these cells. |
| 4 | CD3/Stain 3 only | CD3 marks the cell membrane of T-cells. Stain 3 can appear also with no co-location. No cell can be a T-cell and a B-cell at the same time, so CD3 and CD20 cannot co-locate. |
| 5 | CD3/Stain 3 + CD8/Stain 4 | Some CD3-positive T-cells are additionally CD8-positive. Both markers sit on the cell membrane of T-cells, and every CD8-positive cell is also CD3-positive. Stain 4 can therefore only appear co-located with Stain 3. |
| 6 | Counterstain + CD20/Stain 2 | When imaging a B-cell under the microscope, frequently cell membrane and cell nucleus are together in one pixel - they can sit "on top of each other". These pixels contains a mixture of counterstain and Stain 2 |
| 7 | Counterstain + CD3/Stain 3 | The same happens when imaging a T-cell - the cell membrane stained with Stain 3 and the nucleus stained with the counterstain can appear in the same pixel |
| 8 | Counterstain + CD3/Stain 3 + CD8/Stain 4 | Finally, the membrane of a T-cell that is CD3- and CD8-positive can also be imaged together with that cell's nucleus. |

TABLE 1 shows one example and possible implementation of co-location systems arranged in order of likelihood for one example assay. Exemplary embodiments of the subject disclosure refer to this hierarchy to eliminate implausible co-locations, either before or after unmixing. This list is merely exemplary and not exhaustive—many additional combinations of rules based on the specific assay may be conceived by those having ordinary skill in the art in light of this disclosure.

Figure 5:
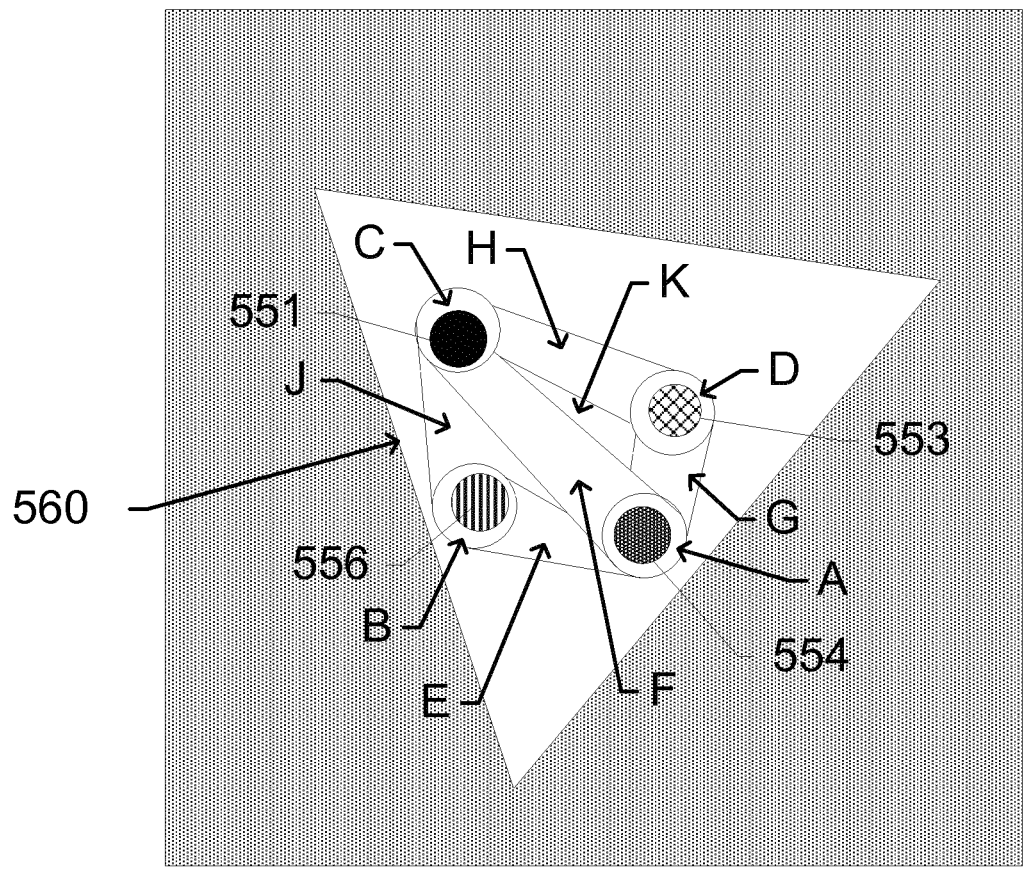
FIG. 5 shows an optical density chart partitioned into sections based on a hierarchy of co-located stains, according to an exemplary embodiment of the subject disclosure.

FIG. 5 shows an optical density space 560 divided into sections of co-located stains, the sections being defined based on a hierarchy of rules or preferences related to the stains in the assay. Similar to the other embodiments described herein, rules specific to the available assay information are invoked to create and define sections of the optical density space having co-located stains. The rules may be in the form of a hierarchy as described above. The sections can be separately unmixed to identify co-locations of specific combinations of stains based on the assay information and preferences.

Each section is unmixed with a system of up to 3 reference stains. The stains in the image include 551, 553, 554, and 556. For example, regions A, B, C, and D exclusively correspond to each of stains 551, 553, 554, and 556, without any co-location. Region E identifies any possible co-location of stains 554, and 556. Region F identifies any possible co-location of stains 554, and 551. Region G identifies any possible co-location of stains 554, and 553. Region H identifies any possible co-location of stains 553, and 551. Region J identifies any possible co-location of stains 551, 554, and 556. Finally, region K identifies any possible co-location of stains 554, 553, and 551. Based on a set of rules, it is further determined that no additional stain co-locations are physiologically plausible. Moreover, certain regions are more likely than other, as shown by their overlap. For instance, a co-location of stains 554 and 551, represented by region F, is more likely to occur than (and is therefore overlapping) the co-location of stains 554 and 553, represented by region G. Region K is the least likely to occur and is therefore overlapped by all other regions. This enables unmixing an image having a number of stains that is greater than a number of color channels. The overlap of regions and the size of sections associated with stain co-location reflect an a-priori probability of certain co-locations to occur. When unmixing with this method is applied to an image of tissue, the a posteriori probability of these co-locations and their structure in an image form an important input to diagnose the stained tissue.

Figure 6A:
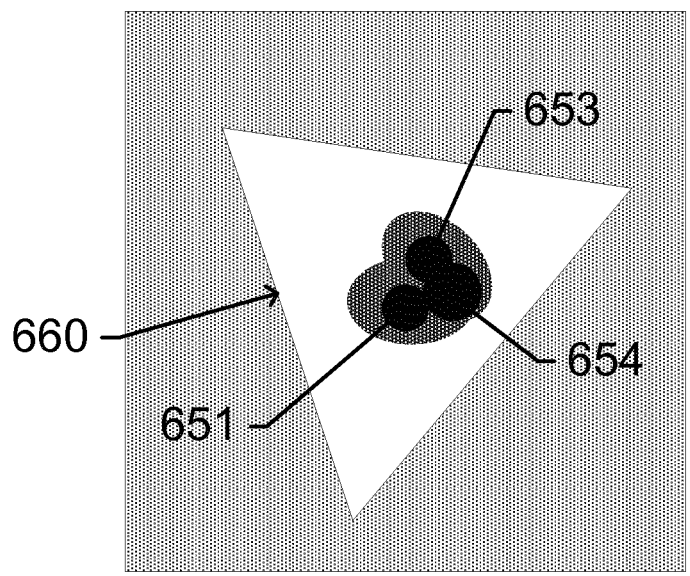
FIGS. 6A-6B show a histogram of an image data, according to exemplary embodiments of the subject disclosure.
Figure 6B:
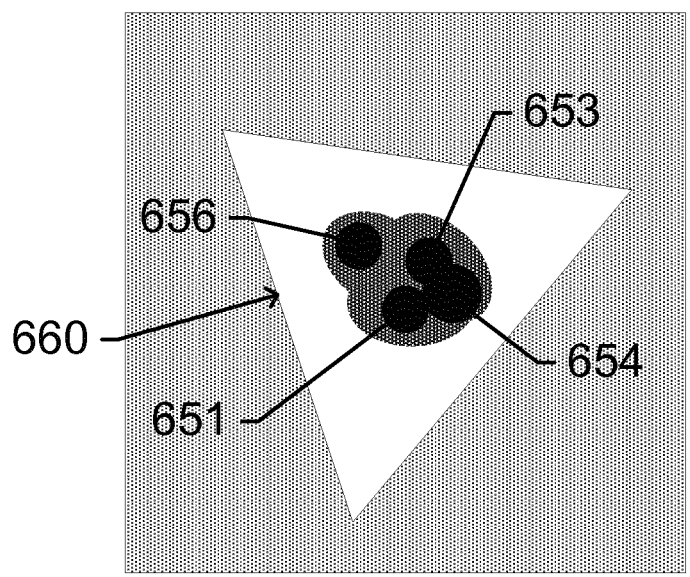

FIG. 6A-6B show histograms for determining co-located stains on an assay, according to an exemplary embodiment of the subject disclosure, namely the adjustment of stain reference vectors to obtain a high-quality unmixing result for new image data. In this embodiment, a histogram and/or histogram data representing the image data is generated. This generated histogram data is compared to expected histogram data for the assay, including, for example, target tissue type, a set of biomarkers, and associated chromogenic stains or fluorophores. Based on this comparison, the reference vectors may be adjusted such that the expected histogram data corresponds more closely to the histogram data that represents the image data. For example, if many pixels in the histogram data fall into bins that represent a pure red color, but the expected histogram data has no entries in these bins, this mismatch can be corrected by modifying the reference vector for a red stain to be more pure.

A plurality of categories or bins is created for different classes of image data. These classes may include, for instance, a hue of a stain. For instance, without needing any information on the total absorbance, or total intensity of each stain, a color or hue for each stained pixel may be allocated to the specific bins, such as yellow, magenta, blue, red, etc. In an exemplary embodiment, there are more bins in the histogram than stains in the assay. Moreover, a threshold for each color channel may be monitored to determine a presence of stains within that color channel in the pixel. The bins and thresholds may be based on assay information. The histogram may map out the presence of all observed hues in an image, and represent a number of pixels within each hue by a relative darkness, as shown in FIGS. 6A-6B.

FIG. 6A depicts a typical histogram for a system with a counter-stain 654 and two IHC stains 651 and 653. An anatomic counter-stain marker here may be blue, with several blue pixels being mixed in with first IHC stain 653, and others being mixed with a second IHC stain 651, and every combination in between also being plausible. FIG. 6B depicts a histogram for an image having four stains 654, 653, 651, and newly added stain 656. The presence of these stains indicates patterns that may be compared to anatomical possibilities. It is observed that although counterstain 654 is very likely to collocate with stains 653 and 651, there is a separation with individual stain 656, which has no connection with the other stains. Thus this can be considered an implausible co-location, and ignored in the unmixing procedure. The expected histogram data for this example assay would not fill the histogram bins that represent mixtures of stain 651 and 653. The method enables optimizing reference vectors for an image having a number of stains that is greater than the number of color channels.

Figure 7A:
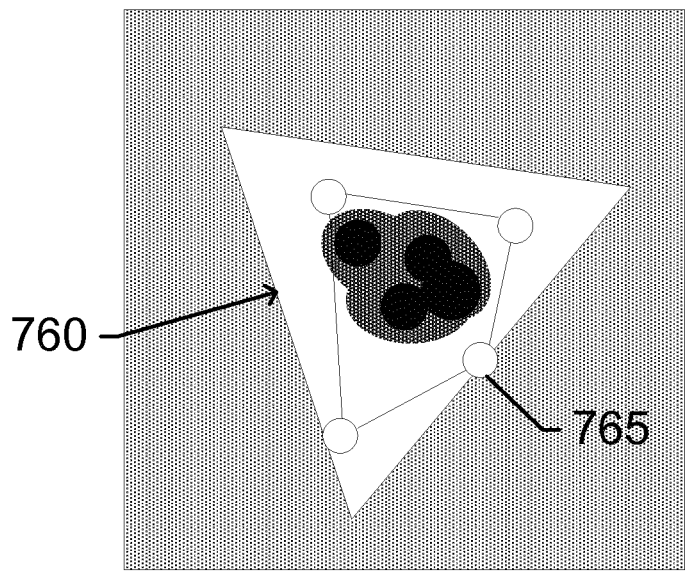
FIGS. 7A-7B show an optimization of reference vectors using a polygon fit on a histogram of an image data, according to exemplary embodiments of the subject disclosure.
Figure 7B:
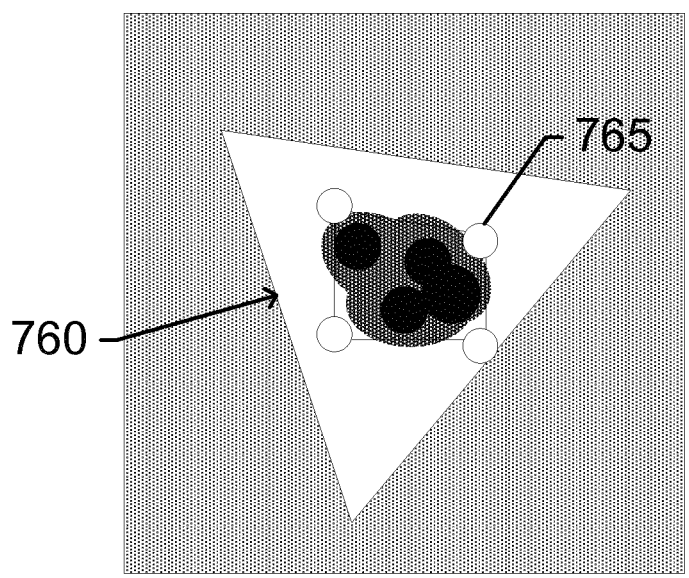

FIGS. 7A-B illustrate an exemplary embodiment for performing the match of expected histogram data to histogram data generated for image data. In this embodiment, a geometric arrangement like a planar arrangement, an arrangement in 3D-space, or any other geometric space of the histogram bins can be compared to a simplex (e.g., a polygon for a planar arrangement) created from the reference vectors of stains in this geometric space. Reference vectors may be used to fit a polygon over the histogram to serve as a visual reference. FIG. 7A shows initial non-optimized vectors forming a polygon 765. The initial reference vectors define "corner points" in the planar arrangement of histogram bins. FIG. 7B shows an ideal polygon fit generated from optimized reference vectors. A reference vector optimization loop can optimize the reference spectra of FIG. 7A to create the model histogram that is most similar to the observed histogram of FIG. 7B. For instance, the polygon fit depicted in FIG. 7A is matched with a model polygon fit shown in FIG. 7B, and it is determined that there could be a better match, or that a quality metric generated from the matching is lower than a threshold. As a consequence, an optimization loop may be performed to create different sets of possible reference vectors within a search space, until a set of reference vectors is found that best matches the histogram.

Moreover, the depicted histogram for three-channel or RGB images may be generated and processed in a more abstract way for multiple dimensions of channels. Although unable to be visualized or graphically depicted, the multi-dimensional histogram would continue to offer a useful comparison with a model histogram based on anatomical knowledge and assay information, and reference vectors adjusted to find the best fit between what is expected and what is observed in the image data.

Therefore, in combination with the reference vector optimization loop described above, and using known physiological and assay information, the histogram comparison with ideal histograms provides a useful indication of which reference vectors are providing a quality image, and which ones need to be adjusted. A numerical optimizer may be used to find a solution within the defined search space to determine the optimal vectors for unmixing the image.

The subject disclosure therefore provides systems and methods, for example computer-implemented systems and methods, for optimizing reference vectors used in unmixing image data to obtain ideal results. Assay information along with correlations of image data to rules depending on the assay information is used to optimize the reference vectors reviewing a tag or metadata associated with the image, input by a user, etc. Minor or subtle changes between the otherwise similar assays can be accounted for by adjusting reference vectors within a search space and determining a quality metric of a subsequent unmixing. In other words, what is known about the assay under analysis can be used to eliminate noise, impossibilities, and enhance target structures of interest, generating a clean image suitable for subsequent analysis or diagnosis. The disclosed systems and methods therefore enable generation of an image substantially consisting of desired or precise signals without any noise or undesired artifacts. Undesired signatures may be iteratively minimized using image-adaptive reference vectors, leaving behind only biologically relevant and physiologically plausible information. Moreover, besides medical applications such as anatomical or clinical pathology, prostrate/lung cancer diagnosis, etc., the same methods may be performed to analysis other types of samples such as remote sensing of geologic or astronomical data, etc. Further, the disclosed repeated iteration enables accurate analysis of large or multiple slide/image analysis, or for analyzing one or more image cubes, and may be ported into a hardware graphics processing unit (GPU), enabling a multi-threaded parallel implementation.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A non-transitory computer-readable medium for storing computer-executable instructions that, when executed by one or more processors of a computing system, cause the computing system to perform operations comprising:
   unmixing an image data extracted from an assay, the unmixing using one or more initial reference vectors;
   determining a quality metric by applying a plurality of rules to one or more signals obtained from the unmixing of the image data; and
   adjusting the one or more initial reference vectors based on the quality metric; and
   unmixing the image data using one or more optimized vectors obtained from the adjusting of the one or more initial reference vectors; and
   determine presence or organization of one or more biomarkers by analyzing the image data unmixed using the one or more optimized vectors;
   wherein the plurality of rules is selected based on the assay information.

2. The computer-readable medium of claim 1, wherein the unmixing, determining, and adjusting are iteratively repeated until the quality metric passes a threshold.

3. The computer-readable medium of claim 1, wherein the assay information further comprises a stain intensity.

4. The computer-readable medium of claim 3, wherein the operations further comprise selecting the initial reference vector from among a plurality of reference vectors based on the stain intensity.

5. The computer-readable medium of claim 1, wherein the assay information further comprises a process parameter of the staining process.

6. The computer-readable medium of claim 1, wherein the assay information further comprises a tissue type.

7. A method for separating colors in an image, the method comprising:
   receiving, at a processor coupled to a workstation, an assay information comprising an image data, the image data comprising a plurality of signals detected from an assay identified in the assay information;

adjusting, by the processor, one or more reference vectors based on a correlation of one or more of the plurality of signals with one or more of a plurality of rules stored on a memory that is communicatively coupled to the processor; and unmixing, by the processor, the one or more of the plurality of signals using the adjusted one or more reference vectors; and determine presence or organization of one or more biomarkers by analyzing the image data unmixed using the one or more optimized vectors.

8. The method of claim 7, wherein plurality of rules comprises minimizing a negative color contribution in the one or more of the plurality of signals.

9. The method of claim 7, wherein the plurality of rules comprises minimizing an unwanted background color contribution.

10. The method of claim 7, wherein the plurality of rules comprises minimizing a high frequency contribution caused by undesired elements.

11. The method of claim 10, wherein the undesired elements comprise fluorescence signals or chromogenic signals from unexpected small structures, strong edges, glass, embedding materials, or background materials.

12. The method of claim 7, further comprising detecting a structure within the image data.

13. The method of claim 12, wherein the plurality of rules comprises a requirement for the structure to have a desired size or shape.

14. The method of claim 12, wherein the plurality of rules comprises a requirement for the structure to co-locate with another structure.

15. The method of claim 7, further comprising adjusting the initial reference vector by a predefined search space.

16. A non-transitory computer-readable medium for storing computer-executable instructions that are, when executed by a processor one or more processors of a computing system, cause the computing system to perform operations comprising:

generating a histogram of color vectors within a reference vector space derived from an image data associated with an assay comprising a stain, the stain being associated with a plurality of markers and a corresponding plurality of reference vectors;

comparing the histogram with a known histogram for the assay; and determining whether or not to adjust one of the plurality of reference vectors based on the comparison;

wherein one or more adjusted reference vectors are used to unmix the image data; and determine presence or organization of one or more biomarkers by analyzing the image data unmixed using the one or more optimized vectors.

17. The computer-readable medium of claim 16, wherein the operations further comprise a polygon fit based on the histogram.

18. The computer-readable medium of claim 16, wherein the histogram comprises a number of different color vectors that is greater than a number of channels comprised by the image.

19. The computer-readable medium of claim 16, wherein the operations further comprise compartmentalizing a section of the reference vector space based on a known co-location.

* * * * *